United States Patent
Zhang et al.

(10) Patent No.: US 9,384,772 B2
(45) Date of Patent: Jul. 5, 2016

(54) MAGNETIC RECORDING MEDIUM HAVING $L1_0$ MAGNETIC LAYER AND PLURALITY OF UNDERLAYERS, AND MAGNETIC STORAGE APPARATUS

(71) Applicant: SHOWA DENKO K.K., Tokyo (JP)

(72) Inventors: Lei Zhang, Chiba (JP); Tetsuya Kanbe, Chiba (JP); Yuji Murakami, Chiba (JP); Kazuya Niwa, Chiba (JP)

(73) Assignee: SHOWA DENKO K.K., Tokyo (JP)

( * ) Notice: Subject to any disclaimer, the term of this patent is extended or adjusted under 35 U.S.C. 154(b) by 36 days.

(21) Appl. No.: 14/333,617

(22) Filed: Jul. 17, 2014

(65) Prior Publication Data

US 2015/0036242 A1 Feb. 5, 2015

(30) Foreign Application Priority Data

Jul. 31, 2013 (JP) ................................. 2013-159099

(51) Int. Cl.
| | | |
|---|---|---|
| *G11B 5/72* | (2006.01) | |
| *G11B 5/73* | (2006.01) | |
| *G11B 5/65* | (2006.01) | |

(52) U.S. Cl.
CPC ................ *G11B 5/7325* (2013.01); *G11B 5/65* (2013.01)

(58) Field of Classification Search
None
See application file for complete search history.

(56) References Cited

U.S. PATENT DOCUMENTS

| | | | |
|---|---|---|---|
| 6,068,739 A | 5/2000 | Suzuki et al. | |
| 8,279,739 B2 | 10/2012 | Kanbe et al. | |
| 8,792,313 B2 * | 7/2014 | Niwa | G11B 13/08 369/13.13 |
| 9,177,585 B1 * | 11/2015 | Seki | G11B 5/7325 |
| 9,245,567 B2 * | 1/2016 | Kanbe | G11B 5/65 |
| 9,251,834 B2 * | 2/2016 | Zhang | G11B 5/65 |
| 2012/0113768 A1 * | 5/2012 | Kanbe | G11B 5/6088 369/13.24 |
| 2012/0214021 A1 * | 8/2012 | Sayama | G11B 5/7325 428/836.1 |
| 2014/0308542 A1 * | 10/2014 | Zhang | G11B 5/7325 428/831.2 |
| 2015/0017480 A1 * | 1/2015 | Hirotsune | G11B 5/314 428/800 |
| 2015/0029830 A1 * | 1/2015 | Zhang | G11B 5/7325 369/13.4 |
| 2015/0117166 A1 * | 4/2015 | Zhang | G11B 5/7325 369/13.5 |

FOREIGN PATENT DOCUMENTS

| | | |
|---|---|---|
| JP | H11-353648 | 12/1999 |
| WO | 2011/021652 | 2/2011 |

OTHER PUBLICATIONS

Ikuya Tagawa et al., "Relationship Between High Density Recording Performance and Particle Coercivity Distribution", IEEE Transactions on Magnetics, vol. 27, No. 6, pp. 4975-4977, Nov. 1991.

* cited by examiner

*Primary Examiner* — Kevin Bernatz
(74) *Attorney, Agent, or Firm* — IPUSA, PLLC (57) ABSTRACT

A magnetic recording medium includes a substrate, a magnetic layer including an alloy having a $L1_0$ type crystal structure as a main component thereof, and a plurality of underlayers arranged between the substrate and the magnetic layer. The plurality of underlayers include a first underlayer including two or more elements selected from a group consisting of Ta, Nb, Ti, and V, and one or more elements selected from a group consisting of W and Mo, and a second underlayer including MgO.

10 Claims, 2 Drawing Sheets

MAGNETIC RECORDING MEDIUM HAVING L1$_0$ MAGNETIC LAYER AND PLURALITY OF UNDERLAYERS, AND MAGNETIC STORAGE APPARATUS

CROSS-REFERENCE TO RELATED APPLICATIONS

This application is based upon and claims the benefit of priority of Japanese Patent Application No. 2013-159099 filed on Jul. 31, 2013, the entire contents of which are incorporated herein by reference.

BACKGROUND OF THE INVENTION

1. Field of the Invention

The present invention relates to a magnetic recording medium and a magnetic storage apparatus.

2. Description of the Related Art

Recently, demands to increase storage capacities of HDDs (Hard Disk Drives) are increasing. As one means of satisfying such demands, a heat-assisted recording method has been proposed. The heat-assisted recording method performs recording with respect to a magnetic recording medium using a magnetic head mounted with a laser light source, by heating the magnetic recording medium by the magnetic head. The heat-assisted recording method can reduce the coercivity of the magnetic recording medium by heating the magnetic recording medium and enable use of a magnetic material having a high crystal magnetic anisotropy constant Ku (hereinafter also referred to as a "high-Ku material") for a magnetic layer of the magnetic recording medium. For this reason, the magnetic grain size of the magnetic layer can be reduced while maintaining thermal stability, and a surface recording density on the order of 1 Tbits/inch$^2$ can be achieved.

On the other hand, a microwave-assisted recording method has been proposed as the next-generation recording method that can satisfy the demands to increase storage capacities of the HDDs. The microwave-assisted recording method can perform the recording with respect to the magnetic recording medium with a recording magnetic field lower than or equal to the coercivity of the magnetic recording medium, by the assistance of a high-frequency magnetic field generated from the magnetic head. As a result, a magnetization direction of the magnetic layer is inclined with respect to an axis of easy magnetization, in order to record magnetic information by locally switching the magnetization of the magnetic layer.

For this reason, similarly as in the case of the heat-assisted recording method, the microwave-assisted recording method can use a high-Ku material for the magnetic layer of the magnetic recording medium. The high-Ku magnetic material may be an alloy having an L1$_0$ crystal structure.

Ordered alloys, such as L1$_0$ type FePt alloys, L1$_0$ type CoPt alloys, L1$_1$ type CoPt alloys, or the like, have been proposed for the high-Ku material. In addition, in order to separate crystal grains of the ordered alloy, the magnetic layer may be added with a grain boundary material, such as an oxide including SiO$_2$, TiO$_2$, or the like, or C, BN, or the like. By employing a granular structure in which the magnetic crystal grains are separated at the grain boundary, a high medium SNR (Signal-to-Noise Ratio) can be achieved.

Recently, there are demands to further increase the high recording density of the magnetic recording medium. Hence, studies have been reported regarding underlayer configurations that are optimized to further improve the recording density.

One proposed method further improves the recording density by use of a magnetic recording medium having a high perpendicular magnetic anisotropy, for example. The high perpendicular magnetic anisotropy of the magnetic recording medium can be achieved by use of the L1$_0$ type ordered alloy having a good (001) orientation for the magnetic layer. The orientation of the L1$_0$ type ordered alloy can be controlled by the underlayer, and thus, the orientation of the magnetic layer can be controlled by use of a suitable underlayer.

For example, Japanese Laid-Open Patent Publication No. 11-353648 proposes forming the L1$_0$ type FePt alloy on an underlayer that includes MgO or the like as a main component thereof and is controlled to have a (100) crystal plane parallel to the substrate surface, in order to obtain a good (001) orientation of the L1$_0$ type FePt alloy.

In addition, as another method of further improving the recording density, there is a method that reduces the grain diameter of the magnetic grains of the magnetic layer. In this case, the alloy having the L1$_0$ crystal structure is required to maintain thermal stability even when the magnetic grain diameter of the magnetic layer is reduced.

For example, International Publication No. 2011/021652 proposes adding B, Si, or C to the underlayer made of an alloy that has a BCC (Body-Centered Cubic) structure and includes Cr as a main component thereof and also includes Ti or the like, in order to reduce a magnetic coupling of the magnetic layer and to reduce a cluster size.

However, when the underlayer proposed in Japanese Laid-Open Patent Publication No. 11-353648 or International Publication No. 2011/021652 is used, peeling caused by peel stress between the underlayers, or between the underlayer and the magnetic layer, may be generated, and an anticorrosion property of the magnetic recording medium may be insufficient to thereby deteriorate a reliability of the magnetic recording medium.

SUMMARY OF THE INVENTION

Embodiments of the present invention may provide a magnetic recording medium and a magnetic storage apparatus which can achieve high anticorrosion.

According to one aspect of the embodiment, a magnetic recording medium may include a substrate; a magnetic layer including an alloy having a L1$_0$ type crystal structure as a main component thereof; and a plurality of underlayers arranged between the substrate and the magnetic layer, wherein the plurality of underlayers include a first underlayer including two or more elements selected from a group consisting of Ta, Nb, Ti, and V, and one or more elements selected from a group consisting of W and Mo, and a second underlayer including MgO.

According to another aspect of the embodiment, a magnetic storage apparatus may include the magnetic recording medium described above, and a magnetic head configured to write information on and read information from the magnetic recording medium.

Other objects and further features of the present invention will be apparent from the following detailed description when read in conjunction with the accompanying drawings.

DESCRIPTION OF THE PREFERRED EMBODIMENTS

A description will be given of the magnetic recording medium and the magnetic storage apparatus in each embodiment of the present invention, by referring to the drawings. The present invention is not limited to the described embodiments, and various variations, modification, and substitutions may be made without departing from the scope of the present invention.

First Embodiment

A description will be given of an example of a configuration of the magnetic recording medium in a first embodiment of the present invention.

The magnetic recording medium in this embodiment includes a substrate, a magnetic layer including an alloy having an $L1_0$ type crystal structure as a main (or primary) component thereof, and a plurality of underlayers arranged between the substrate and the magnetic layer.

The plurality of underlayers include at least a first underlayer and a second underlayer.

The first underlayer may include two or more elements selected from a group consisting of Ta, Nb, Ti, and V, and one or more elements selected from a group consisting of W and Mo.

The second underlayer may include MgO.

The first underlayer and the second underlayer may be consecutively stacked. In other words, the first underlayer and the second underlayer may be arranged to make contact with each other.

A description will be given of the layers forming the magnetic recording medium in this embodiment.

The substrate is not limited to a particular type of substrate. For example, a glass substrate may be used for the substrate, and a heat-resistant glass substrate having an amorphous structure or microcrystalline structure may preferably be used for the substrate. The magnetic recording medium in this embodiment may be subjected to a substrate heating to a temperature of 400° C. or higher at the time of forming the magnetic layer. For this reason, when using the heat-resistant glass substrate for the substrate, a material forming the heat-resistant substrate preferably has a glass transition temperature of 400° C. or higher.

Next, a description will be given of the plurality of underlayers.

As described above, the plurality of underlayers include at least the first underlayer and the second underlayer. The plurality of underlayers preferably have a multi-layer structure in which the first underlayer and the second underlayer are consecutively stacked.

Next, a description will be given of the first underlayer.

The first underlayer may include two or more elements selected from the group consisting of Ta, Nb, Ti, and V, and one or more elements selected from the group consisting of W and Mo.

In this case, the first underlayer may be formed by an alloy including two or more elements selected from the group consisting of Ta, Nb, Ti, and V, and one or more elements selected from the group consisting of W and Mo. More particularly, the first underlayer may be formed by an alloy such as W—Ta—Ti, W—Ta—V, W—Nb—Ti, W—Nb—V, W—Ti—V, Mo—Ta—Ti, Mo—Ta—V, Mo—Nb—Ti, Mo—Nb—V, Mo—Ti—V, or the like. In addition, the first underlayer preferably includes two or more elements selected from the group consisting of Ta, Nb, Ti, and V with a content of 20 at % or greater and 80 at % or less, and more preferably with a content of 30 at % or greater and 70 at % or less. In this case, a lattice constant of the first underlayer can be set in a range of 0.304 nm (in a case in which Mo-70 at % V) to 0.329 nm (in a case in which W-70 at % Ta).

In addition, the first underlayer may preferably further include one or more materials selected from a group consisting of B, Si, C, $B_2O_3$, $SiO_2$, $Cr_2O_3$, $Al_2O_3$, $Ta_2O_5$, $Nb_2O_5$, $ZrO_2$, $Y_2O_3$, $CeO_2$, MnO, $TiO_2$, TiO, ZnO, $La_2O_3$, NiO, FeO, and CoO. By including such materials in the first underlayer, a crystal grain size and a dispersion of the first underlayer may be improved. For this reason, a grain dispersion of the magnetic layer can be improved, and the coercivity of the magnetic recording medium can be improved and the medium SNR of the magnetic recording medium can be increased compared to a case in which such materials are not added to the first underlayer.

Next, a description will be given of the second underlayer. The second underlayer may include MgO, and the second underlayer is preferably made of MgO. The second underlayer is preferably epitaxially grown on the first underlayer having the (100) orientation. In this state, a <110> direction of the (100) plane of the first underlayer and a <100> direction of a (100) plane of MgO are parallel to each other. For this reason, a lattice misfit (or mismatch) of the first underlayer with respect to the second underlayer can be defined as $(a_2 - \sqrt{2}a_1)/(a_2)$ where $a_1$ denotes the lattice constant of the first underlayer, and $a_2$ denotes the lattice constant of the second underlayer.

In a case in which the second underlayer made of MgO is epitaxially grown on the first underlayer, for example, a tensile stress is preferably generated in an in-plane direction of the MgO second underlayer. By generating the tensile stress in the second underlayer, a tensile stress is generated in the alloy used for the magnetic layer and having the $L1_0$ type crystal structure, to thereby promote ordering of the alloy used for the magnetic layer.

In the case in which the MgO second underlayer is epitaxially grown on the first underlayer, the MgO second underlayer preferably includes a tensile stress of 2% to 10% due to the lattice misfit (or mismatch). In this case, peeling caused by peel stress easily occurs in the second underlayer, however, because an easily oxidized element such as Ta, Nb, Ti, V, or the like is added to the first underlayer, a bonding strength at an interface of the first underlayer and the second underlayer made of MgO can be improved. Accordingly, the peeling caused by the peel stress can be suppressed, to thereby improve the anticorrosion property and the reliability of the magnetic recording medium.

As described above, the first underlayer preferably includes two or more elements selected from the group consisting of Ta, Nb, Ti, and V, with a content of 20 at % to 80 at %. However, when the content of the two or more elements selected from the group consisting of Ta, Nb, Ti, and V is 30 at % or greater, the bonding strength at the interface of the first underlayer and the second underlayer made of MgO can be improved, that is, the anticorrosion property of the magnetic recording medium can be improved. On the other hand, when the content of the two or more elements selected from the group consisting of Ta, Nb, Ti, and V exceeds 70 at %, the coercivity of the magnetic recording medium may decrease. Hence, the content of the two or more elements selected from the group consisting of Ta, Nb, Ti, and V included in the first underlayer is more preferably 30 at % or greater and 70 at % or less.

A thickness of the second underlayer is not limited to a particular thickness, however, the thickness may preferably be 0.5 nm or greater and 5 nm or less. In a case in which the thickness of the second underlayer is less than 0.5 nm, it is unpreferable in that MgO forming the second underlayer may not have a good NaCl type structure. On the other hand, in a case in which the thickness of the second underlayer exceeds 5 nm, it is unpreferable in that the tensile stress in the in-plane direction of the MgO second underlayer may be relaxed, and generating a sufficient large tensile stress in the alloy having the $L1_0$ crystal structure and forming the magnetic layer becomes difficult.

Furthermore, the plurality of underlayers may preferably include a third underlayer including a metal having a BCC structure. The first underlayer is preferably formed on the third underlayer. It is furthermore preferable that the third underlayer and the first underlayer are consecutively stacked.

Next, a description will be given of the third underlayer.

The third underlayer preferably includes a metal having the BCC structure. The third underlayer may include either a metal having the BCC structure selected from a group consisting of W (tungsten metal) and No molybdenum metal), or an alloy having the BCC structure selected from a group consisting of an alloy including W as a main component thereof and an alloy including Mo as a main component thereof. In a case in which the alloy having the BCC structure and including W as the main component thereof is used for the third underlayer, a part of W may be substituted by Mo. In addition, in a case in which the alloy having the BCC structure and including Mo as the main component thereof is used for the third underlayer, a part of Mo may be substituted by W.

The alloy having the BCC structure and including W as the main component thereof may preferably include, in addition, an element such as Ta, Nb, Ti, V, Cr, or the like. In addition, the alloy having the BCC structure and including Mo as the main component thereof may preferably include, in addition, an element such as Ta, Nb, Ti, V, Cr, or the like. In these cases, a content of the added element is not limited to a particular content value, however, the added content of the element is preferably within a range that does not deteriorate the BCC structure of the alloy including W or Mo as the main component thereof.

The third underlayer may be formed by a plurality of layers. For example, the third underlayer may have a 2-layer structure including a layer made of W, for example, and a layer made of an alloy having the BCC structure and including W as a main component thereof. In addition, the third underlayer may be formed by a combination of layers made of other materials, and may have a multi-layer structure including three or more layers.

The lattice constant of the material forming the third underlayer is not limited to a particular constant value, however, in a case in which an orientation control underlayer is provided, the third underlayer has a lattice constant such that a lattice misfit (or mismatch) between the orientation control underlayer and the third underlayer is preferably 10% or less. More particularly, the third underlayer preferably has a lattice constant such that a lattice misfit (or mismatch) between the orientation control underlayer and the third underlayer is preferably 6% or less.

The third underlayer may further include one or more materials selected from a group consisting of B, Si, C, $B_2O_3$, $SiO_2$, $Cr_2O_3$, $Al_2O_3$, $Ta_2O_5$, $Nb_2O_5$, $ZrO_2$, $Y_2O_3$, $CeO_2$, MnO, $TiO_2$, TiO, ZnO, $La_2O_3$, NiO, FeO, and CoO. By adding such an element or oxide to the third underlayer, the crystal grain size of the third underlayer decreases, and the dispersion of the third underlayer can further be improved. When adding such an element or oxide to the third underlayer, a content of the added element or oxide is not limited to a particular content value, however, the added content of the element or oxide is preferably within a range that does not deteriorate the (100) orientation of the third underlayer itself.

Because the first underlayer and the second underlayer preferably have the (100) orientation, the third underlayer also preferably has the (100) orientation. In order to achieve the (100) orientation of the third underlayer, the orientation control underlayer is preferably formed under the third underlayer.

The material used for the orientation control underlayer is not limited to a particular material. For example, the orientation control underlayer may be made of NiAl, RuAl, or the like having the B2 structure. In addition, the orientation control underlayer may also be made of Cr, or an alloy having the BCC structure and including Cr as a main component thereof.

For example, the alloy having the BCC structure and including Cr as the main component may include CrMn, CrMo, CrW, CrV, CrTi, CrRu, or the like.

The orientation control underlayer may preferably be formed on an amorphous seed layer. The amorphous seed layer may preferably be made of an amorphous material. For example, preferable amorphous materials may include alloys such as Cr-50 at % Ti, Ni-40 at % Ta, Ti-50 at % Al, or the like.

By forming the orientation control underlayer on the amorphous seed layer at a high temperature of 150° C. to 200° C. or higher, for example, a good (100) orientation of the orientation control underlayer can be obtained.

The magnetic layer made of the alloy having the $L1_0$ type crystal structure as the main component thereof may be formed on the plurality of underlayers described above. Hence, a good (001) orientation of the alloy having the $L1_0$ type crystal structure and included in the magnetic layer can be obtained. At the same time, the ordering of the alloy having the $L1_0$ type crystal structure and included in the magnetic layer can be improved due to the tensile stress from the second underlayer including MgO.

The alloy having the $L1_0$ type crystal structure and included in the magnetic layer as the main component thereof refers to a material in which the alloy has a largest amount of substance in a ratio of amounts of substances, amongst the components (or elements) forming the alloy. The main component of other alloys described in the specification are also used to have similar meanings.

The alloy having the $L1_0$ type crystal structure and included in the magnetic layer as the main component thereof is not limited to a particular alloy. For example, this alloy may be a FePt alloy having the $L1_0$ type crystal structure, or a CoPt alloy having the $L1_0$ type crystal structure.

In addition, crystal grains of the alloy within the magnetic layer and having the $L1_0$ type crystal structure are preferably magnetically isolated within the magnetic layer. In order to achieve this magnetic isolation, the magnetic layer preferably includes one or more kinds of materials selected from a group consisting of $SiO_2$, $TiO_2$, $Cr_2O_3$, $Al_2O_3$, $Ta_2O_5$, $ZrO_2$, $Y_2O_3$, $CeO_2$, MnO, TiO, ZnO, C, B, $B_2O_3$, and BN. Such a composition of the magnetic layer more positively separates the exchange coupling amongst the crystal grains of the alloy having the $L1_0$ type crystal structure, and can further improve the medium SNR.

It is preferable to set the substrate temperature to 600° C. or higher when forming the magnetic layer, in order to promote the ordering of the alloy having the $L1_0$ type crystal structure within the magnetic layer. In this case, elements such as Ag, Au, Cu, Ni, or the like may be added to the alloy having the $L1_0$ type crystal structure, in order to reduce the heating temperature (or ordering temperature). By adding such elements to the alloy having the $L1_0$ type crystal structure, the heating temperature (or substrate temperature) at the time of forming the magnetic layer can be reduced to a range of 400° C. to 500° C.

For example, the following layers or parts, other than the underlayer and the magnetic layer, may also be provided.

For example, a DLC (Diamond-Like Carbon) protection layer may preferably be formed on the magnetic layer. A method of forming the DLC protection layer is not limited to a particular method. For example, the DLC protection layer may be formed by RF-CVD (Radio Frequency-Chemical Vapor Deposition) that forms the layer by decomposing a source gas made of hydrocarbons using high-frequency plasma, IBD (Ion Beam Deposition) that forms the layer by ionizing the source gas using electrons emitted from a filament, FCVA (Filtered Cathodic Vacuum Arc) that forms the layer using a solid C target without using a source gas, or the like. A thickness of the DLC protection layer is not limited to a particular thickness. For example, the thickness of the DLC protection layer may be 1 nm or greater and 6 nm or less. The thickness less than 1 nm is undesirable for the DLC protection layer in that the floating characteristic of the magnetic head may deteriorate. On the other hand, the thickness greater than 6 nm is undesirable for the DLC protection layer in that the magnetic spacing increases and the medium SNR may deteriorate.

A lubricant layer may be formed on the DLC protection layer. For example, the lubricant layer may be formed by coating a lubricant made of a perfluoropolyether fluorocarbon polymer, or the like.

According to the heat-assisted recording method, the magnetic layer of the magnetic recording medium is heated by laser and quickly cooled thereafter, and it is preferable to suppress spreading of a heated spot. For this reason, the provision of a heat sink layer is preferable in that a width of a magnetic transition region can be reduced, and the medium noise can be reduced. A location where the heat sink layer is provided is not limited to a particular location. For example, the heat sink layer may be provided under the orientation control underlayer. For example, a material having a high thermal conductivity, such as Ag, Cu, Al, Au, or alloys including such metals as a main component thereof, may be used for the heat sink layer.

In addition, a soft magnetic underlayer may be provided in order to improve a write characteristic. A material used for the soft magnetic underlayer is not limited to a particular material. For example, the soft magnetic underlayer may be made of an amorphous alloy, such as CoTaZr, CoFeTaB, CoFeTaSi, CoFeTaZr, or the like, a microcrystalline alloy, such as FeTaC, FeTaN, or the like, and a polycrystalline alloy, such as NiFe, or the like. The soft magnetic underlayer may be formed by a single layer of such alloys, or have a stacked multi-layer structure in which two layers of such alloys are antiferromagnetically coupled via an Ru layer having a suitable thickness.

The magnetic recording medium in this embodiment has an improved anticorrosion property, because the underlayers described above are provided. In addition, the coercivity and the medium SNR of the magnetic recording medium are also improved due to the provisions of the underlayers described above.

Second Embodiment

Next, a description will be given of an example of a configuration of the magnetic storage apparatus in this embodiment. Although this example of the magnetic storage apparatus in this embodiment employs the heat-assisted recording method, the recording method is not limited to the heat-assisted recording method. For example, the magnetic recording medium in the first embodiment described above may be used in the magnetic storage apparatus employing the microwave-assisted recording method.

The magnetic storage apparatus in this embodiment may use the magnetic recording medium in the first embodiment described above.

The magnetic storage apparatus may include a medium driving part to rotate the magnetic recording medium, and a magnetic head that includes an optical near-field generator provided on a tip end part thereof. The magnetic storage apparatus may further include a laser generator to heat the magnetic recording medium, a waveguide to guide laser light generated from the laser generator to the optical near field generator, a head driving part to move the magnetic head, and a processing system to process recording signals and reproduced signals.

Figure 1:
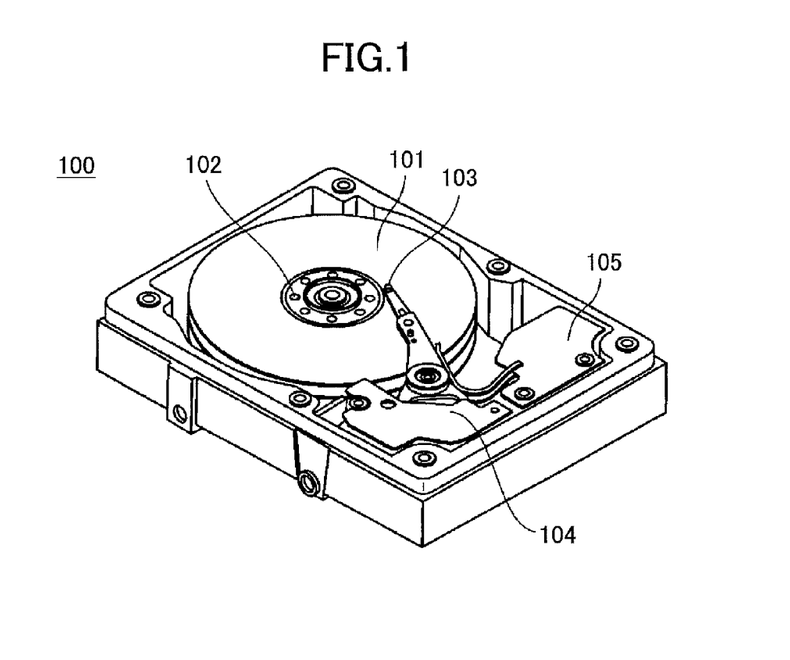
FIG. 1 is a perspective view illustrating a magnetic storage apparatus in a second embodiment of the present invention.

FIG. 1 is a perspective view illustrating the magnetic storage apparatus in this second embodiment of the present invention.

The magnetic storage apparatus in this embodiment may have the configuration illustrated in FIG. 1, for example. More particularly, a magnetic storage apparatus 100 illustrated in FIG. 1 may include a magnetic recording medium 101, a medium driving part 102 to rotate the magnetic recording medium 101, a magnetic head 103, a head driving part 104 to move the magnetic head 103, and a processing system 105 to process recording signals that are to be recorded on the magnetic recording medium 101 and reproduced signals that are reproduced from the magnetic recording medium 101.

Figure 2:
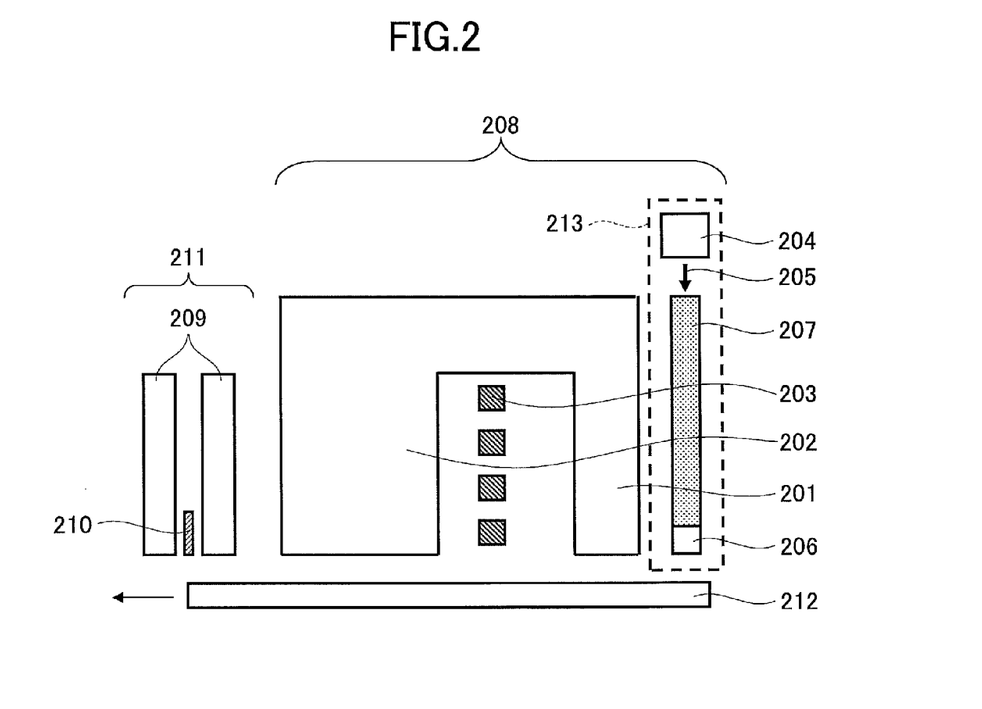
FIG. 2 is a diagram illustrating a configuration of a magnetic head in the second embodiment of the present invention.

The magnetic head 103 may be formed by a heat-assisted head illustrated in FIG. 2, for example. FIG. 2 is a diagram illustrating a configuration of the magnetic head in this second embodiment of the present invention. The heat-assisted head may include a recording head 208 and a reproducing head 211. The recording head 208 may include a main pole 201, an auxiliary pole 202, a coil 203 to generate a magnetic field, an LD (Laser Diode) 204 that forms the laser generator, and a waveguide 207 to guide laser light 205 generated from the LD 204 to an optical near-field generator 206. On the other hand, the reproducing head 211 may include a reproducing element 210 sandwiched by shields 209.

The magnetic recording medium 101 in the first embodiment described above is used as a magnetic recording medium 212. For this reason, the anticorrosion property can be improved, and the reliability of the magnetic storage apparatus 100 can be reduced.

Next, a description will be given of practical examples. However, the present invention is not limited to these practical examples, and various variations, modifications, and substitutions may be made without departing from the scope of the present invention.

Practical Examples Emb1

Figure 3:
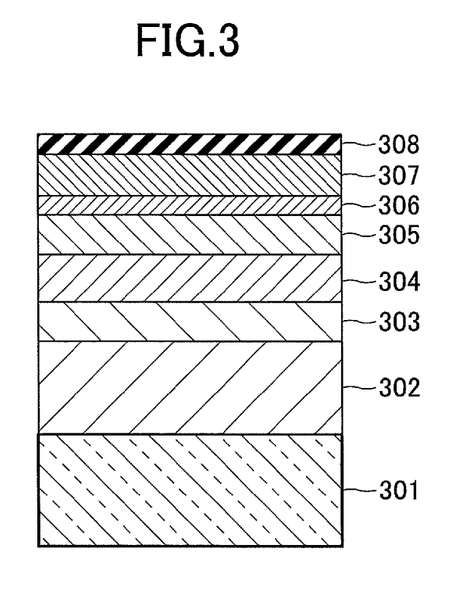
FIG. 3 is a cross sectional view schematically illustrating a configuration of a heat-assisted magnetic recording medium manufactured in practical examples emb1.

FIG. 3 is a cross sectional view schematically illustrating a configuration of a heat-assisted magnetic recording medium manufactured in practical examples emb1. The magnetic recording media in each of the practical examples emb1 are manufactured by forming an Ni-40 at % Ta seed layer 302 having a thickness of 30 nm on a 2.5-inch (diameter) glass substrate 301, and performing a substrate heating at 300° C. Thereafter, an Ru-50 at % Al orientation control layer 303 having a thickness of 10 nm is formed on the seed layer 302.

Next, a W-10 at % Cr third underlayer 304 having a thickness of 10 nm is formed on the orientation control layer 303. In addition, a first underlayer 305 made of materials illustrated in Table 1 and having a thickness of 15 nm is formed on the third underlayer 304. A MgO second underlayer 306 having a thickness of 2 nm is formed on the first underlayer 305.

Next, a substrate heating at 600° C. is performed, and a (Fe-46 at % Pt)-15 mol % $SiO_2$ magnetic layer 307 having a thickness of 8 nm is formed on the second underlayer 306, and a DLC protection layer 308 having a thickness of 3 nm is formed on the magnetic layer 307. The DLC protection layer 308 is coated with a lubricant made of a perfluoropolyether fluorocarbon polymer.

TABLE 1

| | FIRST UNDERLAYER | Hc (kOe) | Δ Hc/Hc | Δ OSA |
|---|---|---|---|---|
| Emb1-1 | W—20 at % Ta—30 at % Ti | 35.6 | 0.27 | 9 |
| Emb1-2 | W—25 at % Ta—25 at % V | 35 | 0.27 | 14 |
| Emb1-3 | W—25 at % Nb—25 at % Ti | 35.6 | 0.27 | 11 |
| Emb1-4 | W—20 at % Nb—30 at % V | 35 | 0.27 | 11 |
| Emb1-5 | W—30 at % Ti—20 at % V | 37.3 | 0.27 | 11 |
| Emb1-6 | Mo—25 at % Ta—25 at % V | 38.3 | 0.29 | 8 |
| Emb1-7 | Mo—15 at % Ta—35 at % Ti | 37 | 0.26 | 12 |
| Emb1-8 | Mo—28 at % Nb—22 at % V | 38.3 | 0.29 | 14 |
| Emb1-9 | Mo—20 at % Nb—30 at % Ti | 37 | 0.26 | 15 |
| Emb1-10 | Mo—20 at % Ti—30 at % V | 36.3 | 0.26 | 11 |
| Emb1-11 | W—20 at % Ta—20 at % Ti—10 at % V | 37 | 0.26 | 12 |
| Emb1-12 | Mo—5 at % W—20 at % Ti—30 at % V | 36.3 | 0.26 | 11 |
| Emb1-13 | (W—30 at % Ta—20 at % V)—4 mol % B | 41.8 | 0.23 | 12 |
| Emb1-14 | (W—20 at % Ta—30 at % Ti)—5 mol % $SiO_2$ | 40.9 | 0.24 | 10 |
| Emb1-15 | (W—22 at % Nb—28 at % Ti)—6 mol % $Al_2O_3$ | 41.6 | 0.24 | 15 |
| Emb1-16 | (W—20 at % Nb—30 at % V)—13 mol % NiO | 41.2 | 0.23 | 13 |
| Emb1-17 | (W—30 at % Ti—20 at % V)—3 mol % $Y_2O_3$ | 40.5 | 0.24 | 13 |
| Emb1-18 | (Mo—30 at % Ta—20 at % Ti)—5 at % Si | 41.4 | 0.23 | 11 |
| Emb1-19 | (W—15 at % Ta—25 at % Ti)—5 mol % $Ta_2O_5$ | 41.2 | 0.24 | 11 |
| Cmp1-1 | — | 30.4 | 0.32 | 940 |

The manufactured magnetic recording medium in each of practical examples Emb1-1 through Emb1-19 have the first underlayer 305 made of the materials illustrated in Table 1. For the practical examples Emb1-1 through Emb1-18, a total content of two or more materials selected from a group consisting of Ta, Nb, Ti, and V is 50 at %. In addition, for the practical examples Emb1-13 through Emb1-19, the first underlayer 305 includes one or more materials selected from a group consisting of B, Si, C, $B_2O_3$, $SiO_2$, $Cr_2O_3$, $Al_2O_3$, $Ta_2O_5$, $Nb_2O_5$, $ZrO_2$, $Y_2O_3$, $CeO_2$, MnO, $TiO_2$, TiO, ZnO, $La_2O_3$, NiO, FeO, and CoO. Further, the manufactured magnetic recording medium in a comparison example Cmp1-1 includes no first underlayer 305, and the second underlayer 306 is formed directly on the third underlayer 304.

A coercivity Hc, a normalized coercivity variance ΔHc/Hc, and a ΔOSA value of the manufactured magnetic recording media are then evaluated for the practical examples Emb1-13 through Emb1-19 and the comparison example Cmp1-1.

The coercivity Hc is obtained from a magnetization curve that is measured at room temperature by applying a magnetic field of 7 T by an SQUID (Superconducting Quantum Interference Device). In addition, the normalized coercivity variance ΔHc/Hc is measured according to a method described in Ikuya Tagawa et al., "Relationship Between High Density Recording Performance And Particle Coercivity Distribution", IEEE Transactions on Magnetics, Vol. 27, No. 6, pp. 4975-4977, November 1991, for example. More particularly, in a major loop and a minor loop measured at room temperature by applying a maximum magnetic field of 7 T, a magnetic field at which the value of the magnetization becomes 50% of the saturated value is measured, and the normalized coercivity variance ΔHc/Hc is measured from a difference of the measured values by assuming that the Hc distribution is a Gaussian distribution. The normalized coercivity variance ΔHc/Hc is a parameter corresponding to the switching field dispersion, and the lower the value of the normalized coercivity variance ΔHc/Hc, the higher the medium SNR and more preferable.

Next, a description will be given of an evaluation of the anticorrosion property. First, a number of particles on the entire surface of each manufactured magnetic recording medium is measured using a particle counter OSA-6300 manufactured by Candela Corporation. Then, each magnetic recording medium is left to stand for 48 hours in a high-temperature reactor in which the temperature and the humidity are maintained constant at 90° C. and 90%, respectively. Thereafter, each magnetic recording medium is removed from the high-temperature reactor, and the number of particles is measured again using the particle counter OSA-6300 manufactured by Candela Corporation. An increase in the measured number of particles after each magnetic recording medium is left to stand for 48 hours in the high-temperature reactor is obtained as the ΔOSA value. The lower the ΔOSA value, the higher the anticorrosion of the magnetic recording medium. In order to obtain a highly reliable magnetic recording medium, the ΔOSA value is preferably 100 or lower, and more preferably 15 or lower, and even more preferably 10 or lower.

Table 1 illustrates evaluation results of the coercivity Hc, the normalized coercivity variance ΔHc/Hc, and the ΔOSA value of the manufactured magnetic recording media in each of the practical examples Emb1-1 through Emb1-19 and the comparison example Cmp1-1.

From the evaluation results illustrated in Table 1, it is confirmed that the magnetic recording media in each of the practical examples Emb1-1 through Emb1-19 have a high coercivity Hc and a low normalized coercivity variance ΔHc/

Hc, compared to those of the magnetic recording medium in the comparison example Cmp1-1.

It is confirmed that, particularly the magnetic recording media in each of the practical examples Emb1-13 through Emb1-19 in which the first underlayer material includes one material selected from a group consisting of B, Si, C, and the above described oxides such as $SiO_2$, have a high coercivity Hc of 40 kOe or higher, and a low normalized coercivity variance ΔHc/Hc of 0.25 or lower.

From the evaluation results illustrated in Table 1, it is confirmed that by providing a first underlayer including two or more elements selected from a group consisting of Ta, Nb, Ti, and V, and one or more elements selected from a group consisting of W and Mo, the high coercivity Hc and the low normalized coercivity variance ΔHc/Hc can be obtained. In addition, because the normalized coercivity variance ΔHc/Hc is low, a high medium SNR can be obtained by the magnetic storage apparatus using such a magnetic recording medium.

Moreover, it is confirmed that by including one or more materials selected from a group consisting of B, Si, C, $B_2O_3$, $SiO_2$, $Cr_2O_3$, $Al_2O_3$, $Ta_2O_5$, $Nb_2O_5$, $ZrO_2$, $Y_2O_3$, $CeO_2$, MnO, $TiO_2$, TiO, ZnO, $La_2O_3$, NiO, FeO, and CoO in the first underlayer, the crystal grain size and the dispersion of the underlayer can be improved, and that the grain dispersion of the magnetic layer formed on the underlayer can also be improved.

It is also confirmed from Table 1 that the ΔOSA value (that is, the increase in the measured number of particles) of the manufactured magnetic recording media in each of the practical examples Emb1-1 through Emb1-19 provided with the second underlayer is 15 or less and low, indicating that these manufactured magnetic recording media have a good anticorrosion property. On the other hand, the ΔOSA value of the manufactured magnetic recording medium in the comparison example Cmp1-1 having no first underlayer is 940 and very high, indicating that the anticorrosion property is greatly deteriorated compared to those of the manufactured magnetic recording media in each of the practical examples Emb1-1 through Emb1-19.

From the evaluation results described above, it is confirmed that the anticorrosion property of the magnetic recording medium can be greatly improved by forming the first underlayer under the second underlayer made of MgO.

Practical Examples Emb2

Figure 4:
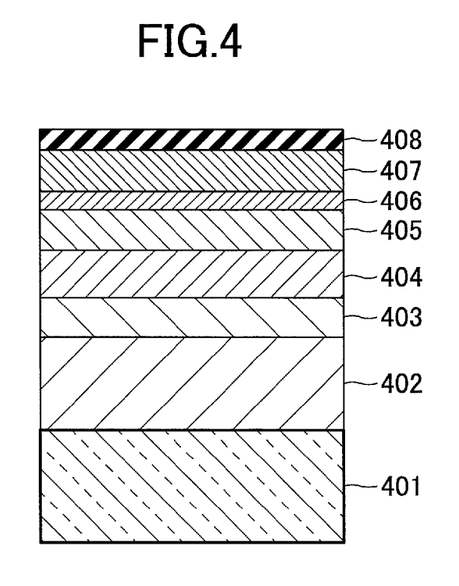
FIG. 4 is a cross sectional view schematically illustrating a configuration of a heat-assisted magnetic recording medium manufactured in practical examples emb2.

FIG. 4 is a cross sectional view schematically illustrating a configuration of a heat-assisted magnetic recording medium manufactured in practical examples emb2.

The magnetic recording media in each of the practical examples emb2 are manufactured by forming a Cr-50 at % Ti seed layer 402 having a thickness of 30 nm on a 2.5-inch (diameter) glass substrate 401, and performing a substrate heating at 300° C. Thereafter, a Cr-5 at % Mn orientation control layer 403 having a thickness of 10 nm is formed on the seed layer 402.

Next, a W-4 at % Si third underlayer 404 having a thickness of 10 nm is formed on the orientation control layer 403. In addition, a first underlayer 405 made of materials illustrated in Table 2 and having a thickness of 15 nm is formed on the third underlayer 404. A MgO second underlayer 406 having a thickness of 2 nm is formed on the first underlayer 405.

Next, a substrate heating at 600° C. is performed, and a (Fe-48 at % Pt)-30 mol % C magnetic layer 407 having a thickness of 8 nm is formed on the second underlayer 406, and a DLC protection layer 408 having a thickness of 3 nm is formed on the magnetic layer 407. The DLC protection layer 408 is coated with a lubricant made of a perfluoropolyether fluorocarbon polymer.

TABLE 2

| | FIRST UNDERLAYER | TOTAL CONTENT OF Ta, Nb, Ti, V | Δ OSA | Hc (kOe) |
|---|---|---|---|---|
| Emb2-1 | W—10 at % Ta—10 at % Ti | 20 at % | 80 | 35.2 |
| Emb2-2 | W—15 at Ti—15 at % V | 30 at % | 14 | 36.2 |
| Emb2-3 | W—20 at % Ta—20 at % Ti | 40 at % | 11 | 37.1 |
| Emb2-4 | W—25 at % Ti—25 at % V | 50 at % | 10 | 37.8 |
| Emb2-5 | W—30 at % Ta—30 at % Ti | 60 at % | 9 | 36.8 |
| Emb2-6 | W—35 at % Nb—35 at % V | 70 at % | 14 | 36.8 |
| Emb2-7 | W—40 at % Ta—40 at % V | 80 at % | 14 | 31.0 |
| Cmp2-1 | — | — | 950 | 30.9 |

The manufactured magnetic recording medium in each of practical examples Emb2-1 through Emb2-7 have the first underlayer 405 made of the materials illustrated in Table 2. For the practical examples Emb2-1 through Emb2-7, the composition of the first underlayer is selected so that a total content of two or more elements selected from a group consisting of Ta, Nb, Ti, and V is 20 at % to 80 at %. In addition, the manufactured magnetic recording medium in a comparison example Cmp2-1 includes no first underlayer 405, and the second underlayer 406 is formed directly on the third underlayer 404.

A coercivity Hc and a ΔOSA value of the manufactured magnetic recording media are then evaluated for the practical examples Emb2-1 through Emb2-7 and the comparison example Cmp2-1, in a manner similar to the practical examples Emb1-1 through Emb1-19 and the comparison example Cmp1-1 described above.

Table 2 illustrates evaluation results of the coercivity Hc and the ΔOSA value of the manufactured magnetic recording media in each of the practical examples Emb2-1 through Emb2-7 and the comparison example Cmp2-1.

From the evaluation results illustrated in Table 2, it is confirmed that by providing a first underlayer including two or more elements selected from the group consisting of Ta, Nb, Ti, and V, where the total content of the two or more elements is 20 at % to 80 at %, ΔOSA values of 100 or less can be obtained, indicating that the manufactured magnetic recording media in each of the practical examples Emb2-1 through Emb2-7 have a good anticorrosion property. For the practical example Emb2-1 in which the total content of the two or more elements is 20 at %, the ΔOSA value is 80 which is slightly higher than those of the practical examples Emb2-2 through Emb2-7. Hence, in order to further improve the anticorrosion property of the magnetic recording medium, it is confirmed that the content of the two or more elements selected from the group consisting of Ta, Nb, Ti, and V and included in the first underlayer is preferably 30 at % or higher.

On the other hand, the ΔOSA value of the manufactured magnetic recording medium in the comparison example Cmp2-1 having no first underlayer is 950 and very high, indicating that the anticorrosion property is greatly deteriorated compared to those of the manufactured magnetic recording media in each of the practical examples Emb2-1 through Emb2-7.

In addition, the coercivity Hc of the manufactured magnetic recording media in each of the practical examples Emb2-1 through Emb2-6 in which the total content of the two or more elements selected from the group consisting of Ta, Nb, Ti, and V and included in the first underlayer is 20 at % to 70 at % is 35 kOe or higher and very high. On the other hand, the coercivity Hc of the manufactured magnetic recording medium in the practical example Emb2-7 in which the total content of the two or more elements selected from the group consisting of Ta, Nb, Ti, and V and included in the first underlayer is 80 at % is 31.0 kOe which is slightly lower than those of the practical examples Emb2-1 through Emb2-6. It may be regarded that the (100) orientation of the first underlayer itself slightly deteriorates compared to those of the practical examples Emb2-1 through Emb2-6 because the total content of the two or more elements selected from the group consisting of Ta, Nb, Ti, and V and included in the first underlayer exceeds 70 at %. For this reason, from the standpoint of maintaining the orientation of the first underlayer itself and obtaining a sufficiently high coercivity Hc, the total content of the two or more elements selected from the group consisting of Ta, Nb, Ti, and V and included in the first underlayer is preferably 70 at % or lower.

The first underlayer includes one or more elements selected from a group consisting of W and Mo. On the other hand, the first underlayer of the practical examples Emb2-1 through Emb2-7 includes only W of the group. However, it may be regarded that both Mo and W exhibit similar functions, and for this reason, the total content of the two or more elements selected from the group consisting of Ta, Nb, Ti, and V and included in the first underlayer is also preferably 20 at % to 80 at %, and more preferably 30 at % to 70 at %, in the case in which the first underlayer includes Mo.

Practical Examples Emb3

Magnetic recording media in each of practical examples Emb3 are manufactured in a manner similar to the magnetic recording media in each of the practical examples Emb2, except that alloys illustrated in Table 3 are used for the first underlayer of the practical examples Emb3-1 through Emb3-6.

TABLE 3

| FIRST UNDERLAYER | LATTICE CONSTANT (nm) | LATTICE MISFIT FROM MgO | Δ OSA |
|---|---|---|---|
| Emb3-1 Mo—55 at % V—10 at % Ti | 0.307 | 3.10% | 12 |
| Emb3-2 W—15 at % Nb—35 at % V | 0.313 | 5.10% | 11 |
| Emb3-3 W—20 at % Ta—20 at % V | 0.317 | 6.50% | 10 |
| Emb3-4 W—20 at % Nb—20 at % Ti | 0.321 | 7.80% | 12 |
| Emb3-5 W—25 at % Ta—25 at % Ti | 0.324 | 8.80% | 9 |
| Emb3-6 W—35 at % Ta—35 at % Ti | 0.327 | 9.80% | 12 |
| Cmp3-1 W—40 at % Cr | 0.307 | 3.10% | 180 |
| Cmp3-2 W—40 at % V | 0.31 | 4.10% | 326 |
| Cmp3-3 Mo—35 at % Nb | 0.318 | 6.80% | 284 |
| Cmp3-4 W—40 at % Ti | 0.321 | 7.80% | 250 |
| Cmp3-5 Ta—30 at % V | 0.324 | 8.80% | 224 |
| Cmp3-6 W—60 at % Ta | 0.327 | 9.80% | 130 |

As illustrated in Table 3, the alloys used for the first underlayer in the practical examples Emb3-1 through Emb3-6 include two or more elements selected from the group consisting of Ta, Nb, Ti, and V and one or more elements selected from the group consisting of W and Mo, and has a lattice constant of 0.307 nm to 0.327 nm. In addition, alloys illustrated in Table 3 are used for the underlayer in comparison examples Cmp3-1 through Cmp3-6.

The anticorrosion property of the manufactured magnetic recording media in each of the practical examples Emb3-1 through Emb3-6 and the comparison examples Cmp3-1 through Cmp3-6 are evaluated in a manner similar to the evaluation for the practical examples Emb1-1 through Emb1-19 and the comparison example Cmp1-1 described above.

The evaluation also includes evaluation of the lattice constant of the alloy forming the first underlayer, and evaluation of the lattice misfit (or mismatch) of the alloy forming the first underlayer with respect to MgO. The lattice constant of the alloy is measured and computed based on results from x-ray diffraction measurements. The lattice constant measurements are evaluated by creating separate samples corresponding to the practical examples Emb3-1 through Emb3-6 and the comparison examples Cmp3-1 through Cmp3-6 for the lattice constant measurement.

The samples for the lattice constant measurement are created by forming a Cr-50 at % Ti amorphous layer having a thickness of 10 nm on a 2.5-inch (diameter) glass substrate 401, and performing a substrate heating at 300° C. Thereafter, the alloys having the BCC structure and having the compositions illustrated in Table 3 is formed on the amorphous layer to a thickness of 50 nm, in order to form a layer having the (110) orientation. The x-ray diffraction measurements are performed on the created samples, and the lattice constants of the alloys forming the first underlayer are computed from peak positions of the (110) plane measured by the x-ray diffraction of the alloys having the BCC structure and having the same compositions as the first underlayer illustrated in Table 3.

The lattice misfit (or mismatch) of each alloy forming the first underlayer with respect to MgO is computed from the lattice constant of each alloy forming the first underlayer and the lattice constant of MgO computed in advance. The lattice misfit (or mismatch) of the first underlayer with respect to MgO is computed from $(a_2-\sqrt{2}a_1)/(a_2)$, where $a_1$ denotes the lattice constant of the first underlayer, and $a_2$ denotes the lattice constant of MgO.

Table 3 illustrates evaluation results of the lattice constant of the first underlayer, the lattice misfit of the first underlayer from MgO, and the ΔOSA value of the manufactured magnetic recording media in each of the practical examples Emb3-1 through Emb3-6 and the comparison examples Cmp3-1 through Cmp3-6.

From the evaluation results illustrated in Table 3, it is confirmed that the ΔOSA value of the manufactured magnetic recording media in each of the practical examples Emb3-1 through Emb3-6 is 15 or lower and low, indicating that these manufactured magnetic recording media have a good anticorrosion property. On the other hand, the ΔOSA value of the manufactured magnetic recording medium in each of the comparison examples Cmp3-1 through Cmp3-6 is higher than 100 and high, indicating that the anticorrosion property is deteriorated compared to those of the manufactured magnetic recording media in each of the practical examples Emb3-1 through Emb3-6.

In addition, as illustrated in Table 3, the lattice misfit of the first underlayer with respect to MgO is 3.1% to 9.8% for each of the practical examples Emb3-1 through Emb3-6 and the comparison examples Cmp3-1 through Cmp3-6. In other words, the tensile tension generated in the MgO second underlayer is approximately the same for the manufactured magnetic recording media of the practical examples Emb3-1 through Emb3-6 and the comparison examples Cmp3-1 through Cmp3-6. However, as described above, the magnetic recording media of the practical examples Emb3-1 through Emb3-6 and the magnetic recording media of the comparison examples Cmp3-1 through Cmp3-6 have considerably different anticorrosion properties. Hence, it is confirmed that the composition of the alloy forming the first underlayer affects the anticorrosion property more than the lattice misfit of the first underlayer with respect to MgO.

From the evaluation results described above, it is confirmed that the anticorrosion property of the magnetic recording medium can be improved by using a suitable composition for the alloy forming the first underlayer.

Practical Examples Emb4

Magnetic recording media in each of practical examples Emb4 are manufactured in a manner similar to the magnetic recording media in each of the practical examples Emb2, except for the matters noted below and that alloys illustrated in Table 4 are used for the third underlayer and the first underlayer of the practical examples Emb4-1 through Emb4-10.

TABLE 4

| | THIRD UNDERLAYER | FIRST UNDERLAYER | MEDIUM SNR (dB) | OW (dB) |
|---|---|---|---|---|
| Emb4-1 | (W—10 at % Ta)—6 mol % SiO$_2$ | (W—25 at % Ta—25 at % V)—8 mol % Si | 16.1 | 36.6 |
| Emb4-2 | (W—10 at % Ta)—3 mol % Ta$_2$O$_5$ | (W—25 at % Ta—25 at % Ti)—4 mol % SiO$_2$ | 16.2 | 36.4 |
| Emb4-3 | (W—10 at % Ta)—5 mol % Cr$_2$O$_3$ | (Mo—25 at % Nb—25 at % Ti)—5 at % B | 16.2 | 36.5 |
| Emb4-4 | (W—10 at % Ta)—13 mol % CoO | (W—25 at % V—25 at % Ti)—3 mol % Y$_2$O$_3$ | 16.2 | 37.8 |
| Emb4-5 | (W—10 at % Ta)—6 mol % Al$_2$O$_3$ | (Mo—25 at % Nb—25 at % V)—10 mol % NiO | 16.2 | 37.3 |
| Emb4-6 | (W—10 at % Ta)—4 mol % Y$_2$O$_3$ | (Mo—25 at % Ti—25 at % V)—8 mol % TiO | 16.1 | 35.7 |
| Emb4-7 | W—10 at % Ta | (W—25 at % Nb—25 at % Ti)—4 mol % Cr$_2$O$_3$ | 15.3 | 34.4 |
| Emb4-8 | W—10 at % Ta | (Mo—25 at % Ta—25 at % Ti)—5 mol % Al$_2$O$_3$ | 15.6 | 35 |
| Emb4-9 | W—10 at % Ta | W—25 at % Ta—25 at % Ti | 13.7 | 26.8 |
| Emb4-10 | W—10 at % Ta | Mo—25 at % Ti—25 at % V | 13 | 27.3 |

When manufacturing the magnetic recording media in each of the practical examples Emb4-1 through Emb4-10, a Cr-5 at % Mn-5 at % B orientation control layer 403 having a thickness of 10 nm is formed on the seed layer 402. In addition, a third underlayer 404 made of alloys having the compositions illustrated in Table 4 and having a thickness of 15 nm is formed on the orientation control layer 403.

For the practical examples Emb4-1 through Emb4-8, the composition of the first underlayer 405 is selected so that a total content of two or more elements selected from a group consisting of Ta, Nb, Ti, and V is 50 at %, and the composition further includes one or more materials selected from a group consisting of B, Si, C, B$_2$O$_3$, SiO$_2$, Cr$_2$O$_3$, Al$_2$O$_3$, Ta$_2$O$_5$, Nb$_2$O$_5$, ZrO$_2$, Y$_2$O$_3$, CeO$_2$, MnO, TiO$_2$, TiO, ZnO, La$_2$O$_3$, NiO, FeO, and CoO, as illustrated in Table 4.

For the practical examples Emb4-9 and Emb4-10, the composition of the first underlayer 405 is selected so as not to be added with B, Si, and C, nor the oxides such as B$_2$O$_3$, SiO$_2$, Cr$_2$O$_3$, Al$_2$O$_3$, Ta$_2$O$_5$, Nb$_2$O$_5$, ZrO$_2$, Y$_2$O$_3$, CeO$_2$, MnO, TiO$_2$, TiO, ZnO, La$_2$O$_3$, NiO, FeO, and CoO, as illustrated in Table 4.

In practical examples Emb4, the magnetic recording medium in each of the practical examples Emb4-1 through Emb4-10 is assembled within the magnetic storage apparatus 100 illustrated in FIG. 1. The magnetic storage apparatus 100 used in the practical examples Emb4 includes the magnetic recording medium 101, the medium drive unit 102 that rotates the magnetic recording medium 101, the magnetic head 103, the head drive unit 104 that moves the magnetic head 103, and the signal processing system 105 that processes signals to be recorded on the magnetic recording medium 101 and signals reproduced from the magnetic recording medium 101 by the magnetic head 103.

The heat-assisted recording head illustrated in FIG. 2 and used in the practical examples Emb4 is used for the magnetic head 103, in order to evaluate the medium SNR and an overwrite characteristic (or overwrite performance) OW.

The heat-assisted head used for the practical examples Emb4 includes the recording head 208 and the reproducing head 211. The recording head 208 includes the main pole 201, the auxiliary pole 202, the coil 203 to generate the magnetic field, the LD (Laser Diode) 204 that forms the laser generator, and the waveguide 207 to guide the laser light 205 generated from the LD 204 to the optical near-field generator 206. On the other hand, the reproducing head 211 includes the reproducing element 210 sandwiched by the shields 209.

The heat-assisted head illustrated in FIG. 2 can heat the magnetic recording medium 212 by the near-field light generated from the optical near-field generator 206, and record signals on the magnetic recording medium 212 in a state in which the coercivity of the magnetic recording medium 212 is reduced to the head magnetic field or lower.

Table 4 illustrates the medium SNR and the overwrite characteristic OW measured using the heat-assisted head illustrated in FIG. 2 to record signals having a pattern in which the bits are all "1"s at a linear recording density of 1600 kFCI, and a track width MWW is defined as a half-width of a track profile. Power input to the LD 204 is set so that the MWW becomes approximately 60 nm.

From the evaluation results illustrated in Table 4, it is confirmed that the medium SNR is 13 dB or higher and sufficiently high, and that the overwrite characteristic OW is 26.8 dB or higher and sufficiently high, for the manufactured magnetic recording media in each of the practical examples Emb4-1 through Emb4-10.

Particularly in the case of the manufactured magnetic recording media in each of the practical examples Emb4-1 through Emb4-8 in which the first underlayer is added with one material selected from the group consisting of B, Si, C, and the oxides such as B$_2$O$_3$, SiO$_2$, Cr$_2$O$_3$, Al$_2$O$_3$, Ta$_2$O$_5$, Nb$_2$O$_5$, ZrO$_2$, Y$_2$O$_3$, CeO$_2$, MnO, TiO$_2$, TiO, ZnO, La$_2$O$_3$, NiO, FeO, and CoO, the medium SNR has a high value of 15 dB or higher, and the overwrite characteristic OW has a high value of 33 dB or higher.

Particularly in the case of the manufactured magnetic recording media in each of the practical examples Emb4-1 through Emb4-6 in which the third underlayer is also added with one material selected from the group consisting of B, Si, C, and the oxides such as B$_2$O$_3$, SiO$_2$, Cr$_2$O$_3$, Al$_2$O$_3$, Ta$_2$O$_5$, Nb$_2$, O$_5$, ZrO$_2$, Y$_2$O$_3$, CeO$_2$, MnO, TiO$_2$, TiO, ZnO, La$_2$O$_3$, NiO, FeO, and CoO, the medium SNR has a high value of 16 dB or higher, and the overwrite characteristic OW has a high value of 35 dB or higher.

Accordingly, it is confirmed that the medium SNR and the overwrite characteristic OW can further be improved by adding one material selected from the group consisting of B, Si, C, and the oxides such as $B_2O_3$, $SiO_2$, $Cr_2O_3$, $Al_2O_3$, $Ta_2O_5$, $Nb_2O_5$, $ZrO_2$, $Y_2O_3$, $CeO_2$, MnO, $TiO_2$, TiO, ZnO, $La_2O_3$, NiO, FeO, and CoO to at least one of the third underlayer and the first underlayer. It may be regarded that the further improvement of the medium SNR and the overwrite characteristic OW is possible because the crystal grain size and the dispersion of the underlayer are improved to thereby improve the grain distribution of the magnetic layer.

According to the embodiments and practical examples described above, the magnetic recording medium can have a high anticorrosion, that is, a good anticorrosion property.

What is claimed is:

1. A magnetic recording medium comprising:
   a substrate;
   a magnetic layer including an alloy having a $L1_0$ type crystal structure as a main component thereof; and
   a plurality of underlayers arranged between the substrate and the magnetic layer,
   wherein the plurality of underlayers include
      a first underlayer made of an alloy selected from a group consisting of W—Ta—Ti, W—Ta—V, W—Nb—Ti, W—Nb—V, W—Ti—V, Mo—Ta—Ti, Mo—Ta—V, Mo—Nb—Ti, Mo—Nb—V, and Mo—Ti—V, wherein a content of two or more elements selected from a group consisting of Ta, Nb, Ti, and V within the alloy is 30 at % or greater and 70 at % or less, and
      a second underlayer including MgO, arranged between the first underlayer and the magnetic layer,
   wherein the second underlayer has a thickness in a range of 0.5 nm to 5.0 nm.

2. The magnetic recording medium as claimed in claim 1, wherein
   the plurality of underlayers include a third underlayer including a metal having a BCC (Body-Centered Cubic) structure, and
   the first underlayer is provided on the third underlayer.

3. The magnetic recording medium as claimed in claim 2, wherein the third underlayer includes either a metal having the BCC structure selected from a group consisting of W and Mo, or an alloy having the BCC structure selected from a group consisting of an alloy including W as a main component thereof and an alloy including Mo as a main component thereof.

4. The magnetic recording medium as claimed in claim 1, wherein the first underlayer further includes one or more materials selected from a group consisting of B, Si, C, $B_2O_3$, $SiO_2$, $Cr_2O_3$, $Al_2O_3$, $Ta_2O_5$, $Nb_2O_5$, $ZrO_2$, $Y_2O_3$, $CeO_2$, MnO, $TiO_2$, TiO, ZnO, $La_2O_3$, NiO, FeO, and CoO.

5. The magnetic recording medium as claimed in claim 1, wherein the magnetic layer includes an FePt alloy having the $L1_0$ type crystal structure or a CoPt alloy having the $L1_0$ type crystal structure, as a main component thereof, and further includes at least one material selected from a group consisting of $SiO_2$, $TiO_2$, $Cr_2O_3$, $Al_2O_3$, $Ta_2O_5$, $ZrO_2$, $Y_2O_3$, $CeO_2$, MnO, TiO, ZnO, C, B, $B_2O_3$, and BN.

6. A magnetic storage apparatus comprising:
   a magnetic recording medium; and
   a magnetic head configured to write information on and read information from the magnetic recording medium,
   wherein the magnetic recording medium includes a substrate, a magnetic layer including an alloy having a $L1_0$ type crystal structure as a main component thereof, and a plurality of underlayers arranged between the substrate and the magnetic layer, and
   wherein the plurality of underlayers include
      a first underlayer made of an alloy selected from a group consisting of W—Ta—Ti, W—Ta—V, W—Nb—Ti, W—Nb—V, W—Ti—V, Mo—Ta—Ti, Mo—Ta—V, Mo—Nb—Ti, Mo—Nb—V, and Mo—Ti—V, wherein a content of two or more elements selected from a group consisting of Ta, Nb, Ti, and V within the alloy is 30 at % or greater and 70 at % or less, and
      a second underlayer including MgO, arranged between the first underlayer and the magnetic layer,
   wherein the second underlayer has a thickness in a range of 0.5 nm to 5.0 nm.

7. The magnetic storage apparatus as claimed in claim 6, wherein
   the plurality of underlayers of the magnetic recording medium include a third underlayer including a metal having a BCC (Body-Centered Cubic) structure, and
   the first underlayer is provided on the third underlayer.

8. The magnetic storage apparatus as claimed in claim 7, wherein the third underlayer includes either a metal having the BCC structure selected from a group consisting of W and Mo, or an alloy having the BCC structure selected from a group consisting of an alloy including W as a main component thereof and an alloy including Mo as a main component thereof.

9. The magnetic storage apparatus as claimed in claim 6, wherein the first underlayer of the magnetic recording medium further includes one or more materials selected from a group consisting of B, Si, C, $B_2O_3$, $SiO_2$, $Cr_2O_3$, $Al_2O_3$, $Ta_2O_5$, $Nb_2O_5$, $ZrO_2$, $Y_2O_3$, $CeO_2$, MnO, $TiO_2$, TiO, ZnO, $La_2O_3$, NiO, FeO, and CoO.

10. The magnetic storage apparatus as claimed in claim 6, wherein the magnetic layer of the magnetic recording medium includes an FePt alloy having the $L1_0$ type crystal structure or a CoPt alloy having the $L1_0$ type crystal structure, as a main component thereof, and further includes at least one material selected from a group consisting of $SiO_2$, $TiO_2$, $Cr_2O_3$, $Al_2O_3$, $Ta_2O_5$, $ZrO_2$, $Y_2O_3$, $CeO_2$, MnO, TiO, ZnO, C, B, $B_2O_3$, and BN.

* * * * *